United States Patent [19]

LaPierre

[11] 3,974,571
[45] Aug. 17, 1976

[54] SINE BAR

[76] Inventor: George W. LaPierre, c/o One Financial Plaza, Suite 2400, Lauderdale Lakes, Fla. 33394

[22] Filed: Mar. 18, 1975

[21] Appl. No.: 559,541

Related U.S. Application Data

[63] Continuation of Ser. No. 402,283, Oct. 1, 1973, abandoned.

[52] U.S. Cl. ............................................... 33/174 S
[51] Int. Cl.² ........................................... B23Q 3/04
[58] Field of Search .......... 33/174 S, 174 H, 174 E, 33/174 TC, 174 TA

[56] References Cited
UNITED STATES PATENTS

| | | | |
|---|---|---|---|
| 1,308,451 | 7/1919 | Schachat | 33/174 S |
| 2,489,733 | 11/1949 | Ullman | 33/174 S |
| 3,345,754 | 10/1967 | Lipkins | 33/174 S |

Primary Examiner—Richard E. Aegerter
Assistant Examiner—Willis Little
Attorney, Agent, or Firm—Malin & Haley

[57] ABSTRACT

An improved sine bar for use in machine tooling operations which provides increased efficiency by an operator in work piece lay-out and machining. The device includes a sine bar pivotally coupled on the front face of block which is mountable on a plate, vise jaw, angle plate, or the like and an integral locking means for positioning and holding a work piece at a desired cutting or grinding angle.

5 Claims, 4 Drawing Figures

SINE BAR

This is a continuation of application Ser. No. 402,283, filed Oct. 1, 1973, now abandoned.

BACKGROUND OF THE INVENTION

This invention relates generally to a sine bar for use in machine tooling operations which allows an operator to position and hold a work piece to be cut, laid out or ground at a predetermined angle. In the past, the layout machining of a work piece with a sine bar in a vise has been cumbersome and time consuming for an operator. Applicant's improved device provides a compact sine bar having a positive work piece locking means, the sine bar being adjustable for angular positions of zero to 180° which may be set from top, sides and base.

BRIEF DESCRIPTION OF THE INVENTION

An improved sine bar comprising a mounting block, a sine bar pivotally connected at one end to said block along one surface face of said block, said block having an inner grooved nut retaining channel, said block channel cross-sectionally shaped to receive and retain a nut, a threaded locking member coupled through said sine bar adjacent the free end of said sine bar, a nut connected to said threaded locking member and received into said channel for positively locking said bar in a fixed position relative to said block, a ball-shaped member connected at the free end of said sine bar, and a work piece stopping means moveably connected to said block channel and positively lockable relative to positions along said channel. The block may include a plurality of holes disposed laterally therethrough which allow for ease of mounting the block on a vise or other holding device.

In operation, the block is placed on a suitable mounting means using the standard holes protruding therethrough. Gage blocks or a depth micrometer or indicator is used to adjust the angle of the sine bar and the positive locking means is tightened to lock the bar firmly at the angle desired. A work piece to be cut is placed on the sine bar and positioned to cut the work piece at the desired angle. In order to do repetitive work, the work piece stopping means is positioned and locked. The work piece is then positively locked by a moveable jaw, vise or clamp on the sine bar block.

It is an object of this invention to provide an improved sine bar which allows the operator to positively lock a sine bar at a predetermined angle accurately.

It is another object of this invention to provide a sine bar having improved locking characteristics utilizing a channel within said block which reduces the width of the sine bar block so that it may be easily positioned within a vise.

Another object of this invention is to allow 180° angle of adjustment which can be adjusted from bottom, sides and top.

And still yet another object of this invention is to provide a sine bar and bar mounting means which provides for stopping and locking a work piece in position in conjunction with the locking of the sine bar at the proper angle.

And still yet another object of this invention is to provide a sine bar that provides efficient work piece lay-out and machining by an operator in a vise or angle plate for positioning and locking work at a particular angle.

In accordance with these and other objects which will be apparent hereinafter, the instant invention will now be described with particular reference to the accompanying drawings.

PREFERRED EMBODIMENT OF THE INVENTION

Figure 1:
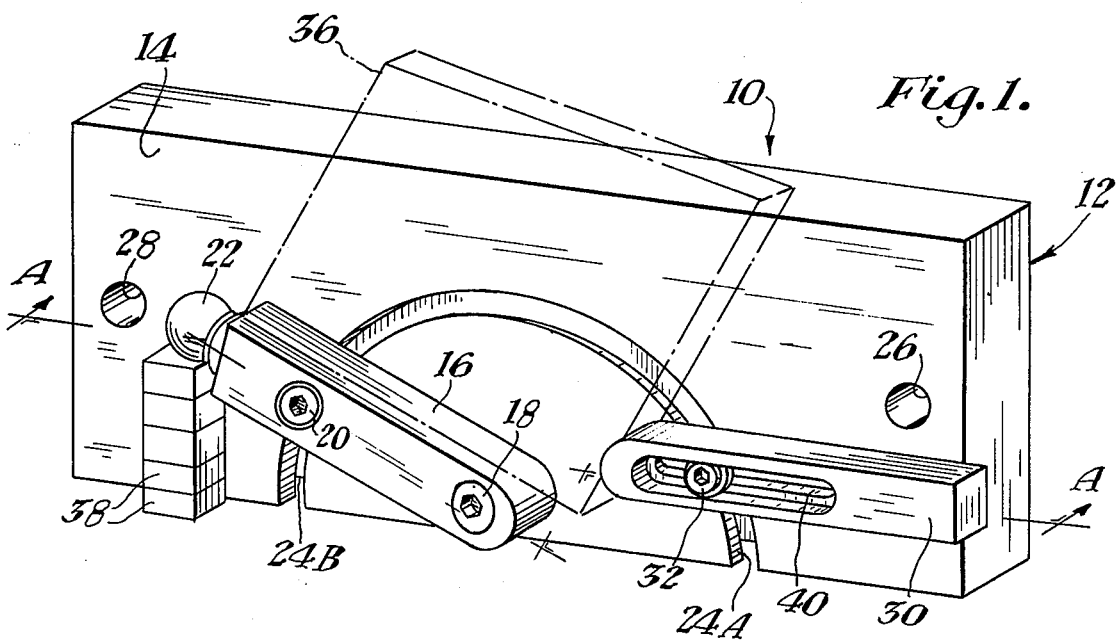
FIG. 1 shows Applicant's improved sine bar in perspective with a work piece (in phantom) thereon and gage blocks utilized to measure the proper angle of the sine bar.

Referring now to the drawings, especially FIG. 1, Applicant's improved sine bar is shown generally at 10 comprising a mounting block 12 having a T-shaped arcuate channel 24 disposed within block 12 in a semi-circular arc. Pivotally mounted to the block 12 adjacent surface 14 is sine bar 16 having a pivot pin 18 which is connected into the block 12. A first positive locking screw 20 having an Allen head protrudes through block channel opening 24A and is threadably connected to nut 34 (FIG. 2) in channel 24B. The block also has a plurality of apertures 26 and 28 extending therethrough which are used to mount the block in a standard vise or the like. Also disposed in block channel opening 24A is a second locking screw 32 connected to nut 48 retained in channel 24B which allows the stop 30 to be locked at any position along channel 24.

The sine bar 16 is positioned to achieve the desired work piece cutting angle by utilizing either gage blocks 38 which contact a point on ball 22 to set a predetermined angle or by use of a depth micrometer or protractor. When the desired position of the bar 16 is achieved, the first locking screw 20 is rotated so that the nut 34 (FIG. 2) is tightened, thereby locking the bar into position relative to the block face 14. At this time the gage blocks 38 may be removed and the work piece 36 which is to be cut is then positioned on the upper surface of the bar 16. The stop 30 is positioned to hold the work piece 36 along the top of the bar in a desired position. The stop 30 has an elongated elliptical groove 40 disposed therein which allows the stop 30 to be moved laterally and pivotally along its longitudinal dimension prior to being locked in place by the locking nut 32. After the stop 30 is positioned, locking screw 32 and nut 48 are tightened (FIG. 2) to hold the stop in place.

Figure 2:
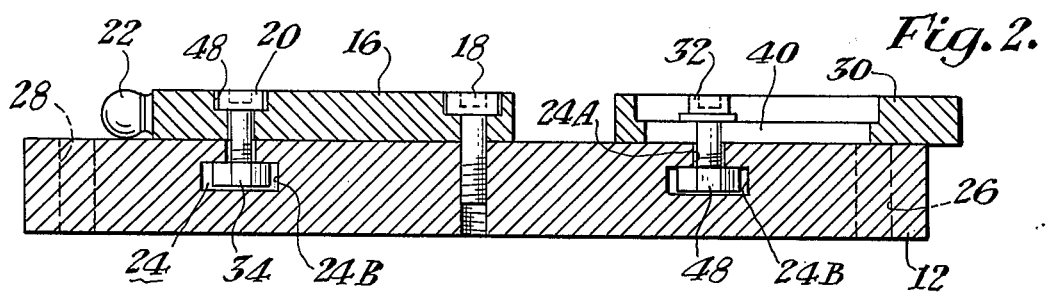
FIG. 2 shows a bottom plan view of Applicant's invention in cross-section along line A—A to show the block channel disposed throughout the sine bar block.

The block channel 24 as shown in FIG. 2 is T-shaped and sized to receive a nut that will be utilized for locking both the sine bar 16 and the stop 30 in position. The block channel 24 is a semi-circular arc so that the sine bar may be positioned to be set at any angle between zero degrees and 180°. This position also allows the stop to be positioned adjacent block surface 14 to properly hold a work piece in place.

Figure 3:
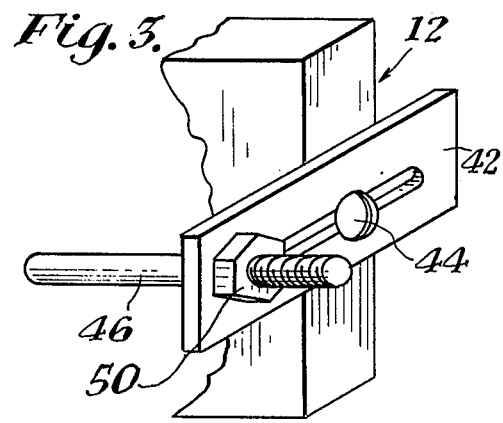
FIG. 3 shows an additional adjustable stopping means which may be coupled to one surface of the sine bar block.

FIG. 3 shows an additional adjustable stop 46 which may be mounted on an end face of block by bracket 42 and positioned and held by a threaded screw 44 received into the block and tightened therein. The additional stop 46 is adjusted longitudinally by rotation relative to nut 50. Lateral adjustment is achieved by positioning bracket 42.

Figure 4:
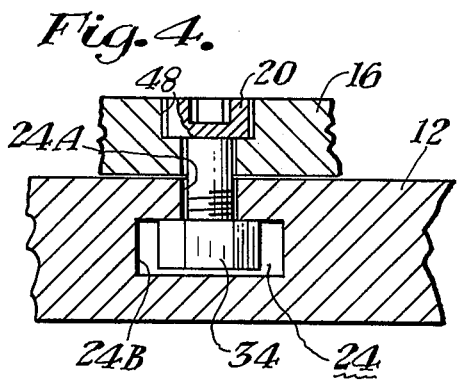
FIG. 4 shows an enlarged view in cross-section of the positive locking means utilized in Applicant's sine bar.

FIG. 4 shows an enlarged view of the locking means for the sine bar 16 comprising a threaded screw 20 through aperture 48 within sine bar 16 and narrow slit 24A into channel 24B which houses nut 34 and prevents the rotation thereof of the nut 34. Thus, the rotation of screw 20 tightens the nut causing a friction lock between the surfaces of the sine bar and the block housing preventing the movement of the sine bar. As shown in the preferred embodiment, the channel 24 is disposed in the interior section of the block 12. However, in an alternate embodiment the channel may be disposed along the back face of the block if a 180° adjustment is not deemed necessary.

To operate Applicant's sine bar, first the desired angle is selected at which the work piece is to be cut. The sine bar is then adjusted to that angle using either gage blocks, a protractor or micrometer. Returning to FIG. 1, the locking screw 20 is then tightened at the desired sine bar angle. A work piece 36 is then positioned on the sine bar at the desired position. The stop 30 is then likewise positioned until it rests against the work piece to hold it positively in position, at which time the locking screw 32 is tightened to hold the stop 30 in position. The entire unit is then placed in an appropriate vise utilizing block apertures 26 and 28 respectively and positioned within the vise so that the work piece is firmly held for the grinding or machining operation.

The block channel 24 has a narrow channel opening 24A and a larger channel portion 24B which is necessary to prevent the nut 34 from being allowed to move toward the face of the sine bar when the locking screw 20 is tightened thereby insuring a rigid locking of the sine bar. The block 12, which can be any shape is preferably narrow and rectangular while the locking screw heads and the bar pivot means are all flush with the bar face to insure and to allow for use in a vise so that the device as a whole does not allow for protruding means which would interfere with the vise closing on the work piece. Another jaw or moveable section of vise may be used for thin work pieces allowing mounting of a piece to this jaw to clear the sine bar. The pivot 18 is received through the sine bar and connected into the block 12. The block may be modified to provide a 360° sine bar locking by utilizing a circular grooved channel.

The instant invention has been shown and described herein in what is considered to be the most practical and preferred embodiment. It is recognized, however, that departures may be made therefrom within the scope of the invention and that obvious modifications will occur to a person skilled in the art.

What I claim is:
1. A sine bar comprising:
a block housing;
a sine bar pivotally mounted at one end to said block housing adjacent one surface of said block housing;
said block housing having a channel disposed therein;
means connected through said sine bar adjacent the free end thereof and disposed within said block housing channel for rigidly locking said sine bar to a fixed predetermined angle relative to said block housing;
a work piece stopping means; and
a connecting means adjustably connecting said work piece stopping means to said block housing and disposed within said block housing channel for rigidly blocking said stopping means at a fixed position relative to said block housing.
2. A sine bar, as in claim 1, wherein:
said block housing channel is a 180° arc.
3. A sine bar, as in claim 2, wherein:
said block channel housing has a T-shaped cross-sectional area.
4. A sine bar, as in claim 1, wherein:
said sine bar locking means includes a threaded screw disposed through said sine bar and a nut connected to said screw and disposed within said block housing channel.
5. A sine bar, as in claim 1, including:
a ball-shaped member connected to the free end of said sine bar.

* * * * *